(12) United States Patent
Matsumae

(10) Patent No.: US 7,684,075 B2
(45) Date of Patent: Mar. 23, 2010

(54) COMMUNICATION DEVICE APPLIED TO CONFIRMING ERROR REPORTING

(75) Inventor: Keisaku Matsumae, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 972 days.

(21) Appl. No.: 11/420,464

(22) Filed: May 25, 2006

(65) Prior Publication Data

US 2006/0271829 A1    Nov. 30, 2006

(30) Foreign Application Priority Data

May 27, 2005    (JP)    ............................. 2005-156373

(51) Int. Cl.
*G06F 11/00*    (2006.01)
(52) U.S. Cl. .................... 358/1.15; 358/402; 714/48
(58) Field of Classification Search .................. 358/1.5, 358/1.15, 402; 714/48
See application file for complete search history.

(56) References Cited

U.S. PATENT DOCUMENTS

| 5,191,373 | A | * | 3/1993 | Nakano | ...................... 396/287 |
| 5,539,530 | A | * | 7/1996 | Reifman et al. | ............. 358/402 |
| 2003/0128402 | A1 | * | 7/2003 | Tanimoto | ..................... 358/402 |
| 2005/0287992 | A1 | * | 12/2005 | Hagiwara et al. | ........ 455/412.2 |

FOREIGN PATENT DOCUMENTS

| JP | H10-65857 A | 3/1998 |
| JP | 2002/232625 A | 8/2002 |
| JP | 2002-321843 A | 11/2002 |

\* cited by examiner

*Primary Examiner*—Benny Q Tieu
*Assistant Examiner*—Qian Yang
(74) *Attorney, Agent, or Firm*—Shinjyu Global IP

(57) ABSTRACT

The present invention provides a communication device that reduces waste in paper, toner, and the like that are used for printing error reports, by eliminating the output of an error report when a user has noticed the occurrence of a communication error. The communication device may not print out an error report when a communication error occurs due to the failure to establish a connection with a recipient. An error report will be printed only when a user has not confirmed the occurrence of a communication error within a predetermined time period from the time the communication error occurred. Thus, output of an error report can be prohibited whenever a communication error occurs, and thus waste in paper, toner, and the like which are used for printing error reports can be reduced.

2 Claims, 4 Drawing Sheets

COMMUNICATION DEVICE APPLIED TO CONFIRMING ERROR REPORTING

CROSS-REFERENCE TO RELATED APPLICATIONS

This application claims priority to Japanese Patent Application No. 2005-156373. The entire disclosure of Japanese Patent Application No. 2005-156373 is hereby incorporated herein by reference.

BACKGROUND OF THE INVENTION

1. Field of the Invention

The present invention relates to a communication device such as a facsimile. More specifically, the present invention relates to a communication device that functions to inform a user of a communication error by printing out an error report when the communication error occurs.

2. Background Information

Japan Patent Application Publication JP-A-2002-232625 discloses a communication device, such as a facsimile, a multifunction device with a facsimile function, and the like, that prints out an error report on which a communication error is recorded when a communication error occurs. A communication error refers an error in which a connection with another communication device is disabled due to, for example, a nonexistent telephone number having been input into to that communication device.

If the communication device fails to connect, the communication device will make several additional attempts to connect to the other communication device. If the communication device cannot connect to the other communication device within a predetermined number of attempts, the communication device is generally configured to recognize the situation as a communication error. Therefore, a communication error often occurs after a predetermined time has elapsed from the time a user has operated the communication device, such as the input of a telephone number thereto and the like. In addition, when a communication error occurs, a user is often away from the communication device. Thus, even if a communication error occurs, the user often will not notice the occurrence of the communication error. On the other hand, a communication device will be able to bring the communication error to the attention of the user by outputting an error report to the user after the occurrence of a communication error.

However, a user may have already noticed the occurrence of the communication error by the time the user reads the error report. In other words, when the user is in the vicinity of the communication device, the user may have noticed the occurrence of the communication error even if an error report is not output. However, conventional communication devices output error reports whenever a communication error occurs. Therefore, papers, toner, and the like, are wasted in order to print the error reports.

In view of the above, it will be apparent to those skilled in the art from this disclosure that there exists a need for an improved communication device. This invention addresses this need in the art as well as other needs, which will become apparent to those skilled in the art from this disclosure.

SUMMARY OF THE INVENTION

It is an object of the present invention to provide a communication device that reduces the number of times that error reports are output, and reduces the waste in paper, toner, and the like used for printing the error reports.

The communication device in accordance with the present invention will not necessarily print out an error report when a communication error occurred due to a failure to establish a connection with another communication device. If a user confirms the occurrence of a communication error, the communication device is configured not to output an error report. In addition, an error report will be printed only if a user did not confirm the occurrence of a communication error within a predetermined time after the occurrence of a communication error.

For example, a user can confirm whether or not a communication error has occurred by pressing an operation panel or a key arranged on the communication device. Thus, if the communication device determines whether or not this confirmation has occurred based upon whether or not the operation panel or the key arranged on the communication device has been pushed, the communication device will determine that the user has confirmed the occurrence of a communication error when it determines that the operation panel or key has been pushed within a predetermined time after the communication error occurred.

The types of communications for which an error report is printed out when a failure occurs are not limited to specific types of communications such as communication by fax and internet. Therefore, the communication device of the present invention can be applied to any device having a communication function, such as a fax, a multifunction device, or the like.

In addition, the content of an error report is not limited to a specific content as long as it allows a user to identify which communication resulted a communication error. For example, the date and time of a communication error, the content of the communication error, and the like can be described in the error report.

The communication device in accordance with the present invention will not print out an error report if a user has confirmed the occurrence of a communication error within a predetermined period of time. Therefore, it is possible to reduce waste in paper, toner, and the like which are used for printing the error reports.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which from a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
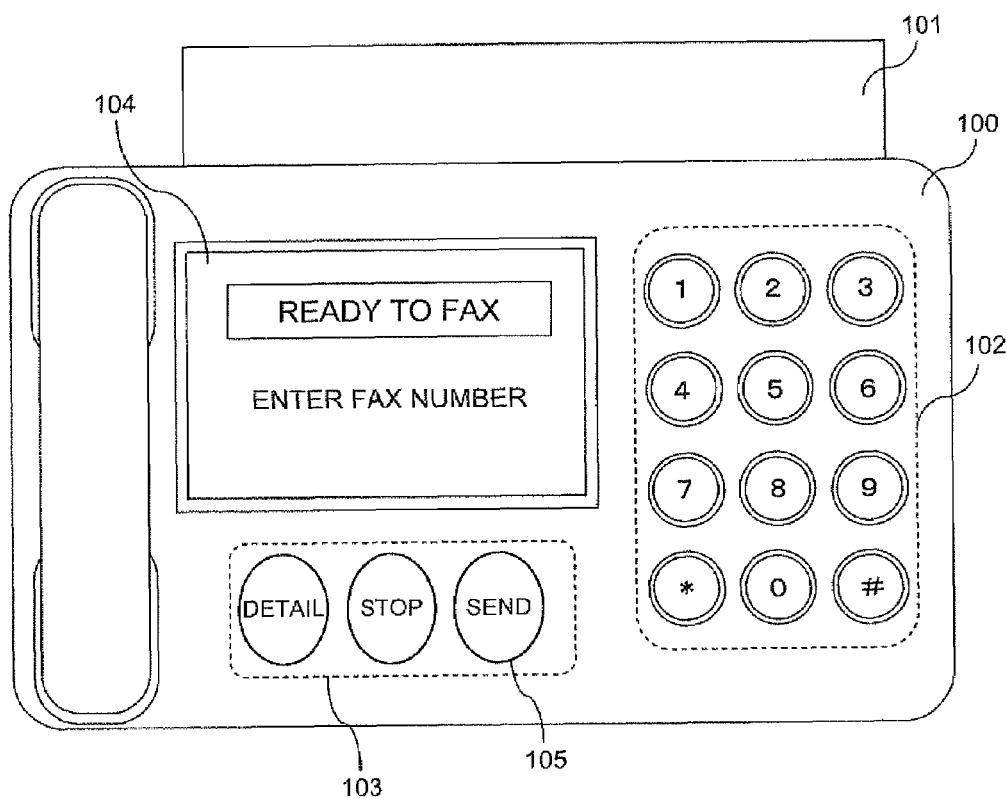
FIG. 1 is an exterior view of a communication device in accordance with an embodiment of the present invention.
Figure 2:
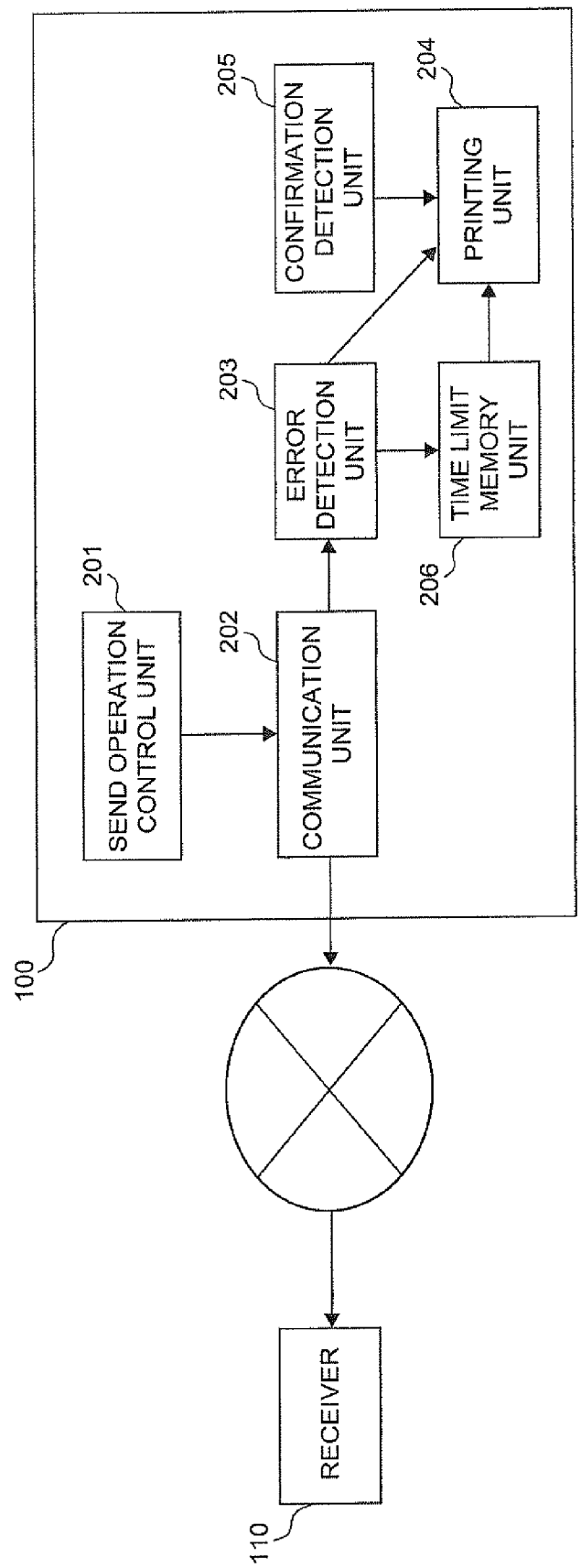
FIG. 2 is a functional block diagram of the communication device in accordance with an embodiment of the present invention.
Figure 3:
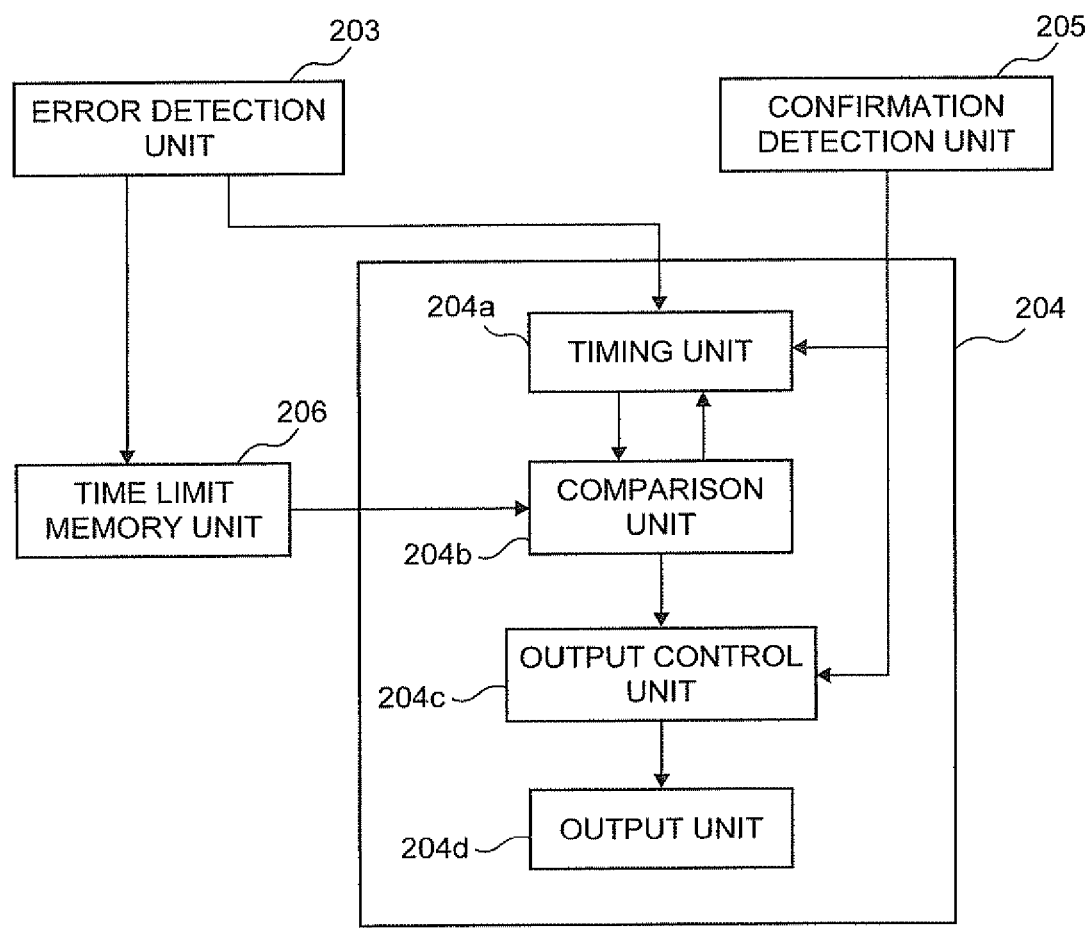
FIG. 3 is a functional block diagram of a printing unit and the peripheral units thereof shown in FIG. 2.

A communication device 100 in accordance with one embodiment of the present invention performs facsimile communication with other communication devices. As shown in FIG. 1, the communication device 100 in accordance with one embodiment of the present invention is comprised of a paper tray 101 on which paper or other recording media can be placed, a numeric keypad 102, function keys 103, and a display panel 104. The function keys 103 include a send button 105. In addition, as shown in FIG. 2, the communication device 100 further comprises a send operation control unit 201, a communication unit 202, an error detection unit 203, a printing unit 204, a confirmation detection unit 205, and a time limit memory unit 206. Furthermore, as shown in FIG. 3, the printing unit 204 comprises a timing unit 204a, a comparison unit 204b, an output control unit 204c, and an output unit 204d.

When transmitting an original document by facsimile using the communication device 100, a user will first place the original document on the paper tray 101. Then, the user will enter the telephone number (i.e., the facsimile number) of the intended recipient using the numeric keypad 102, and then push the send button 105.

Here, the send operation control unit 201 shown in FIG. 2 will recognize that a telephone number was input from the numeric keypad 102, and that the send button 105 was pushed. When the send operation control unit 201 recognizes that a telephone number has been input and that the send button 105 has been pushed, it will notify the communication unit 202 of that telephone number.

When the communication unit 202 is notified of the telephone number, the communication unit 202 will scan the original document placed on the paper tray 101. When the communication unit 202 has scanned the original document, the communication unit 202 will attempt to connection with intended recipient 110 that is indicated by the telephone number. If a connection with the receiver 110 has been established, the communication unit 202 will transmit the scanned original document to the recipient 110.

On the other hand, if a connection cannot be established, the communication unit 202 will again attempt to establish a connection with the recipient 110. After the communication unit 202 has attempted to establish a connection with the recipient 110 a predetermined number of times, the communication unit 202 will notify the error detection unit 203 of the failure to establish a connection.

Figure 4:
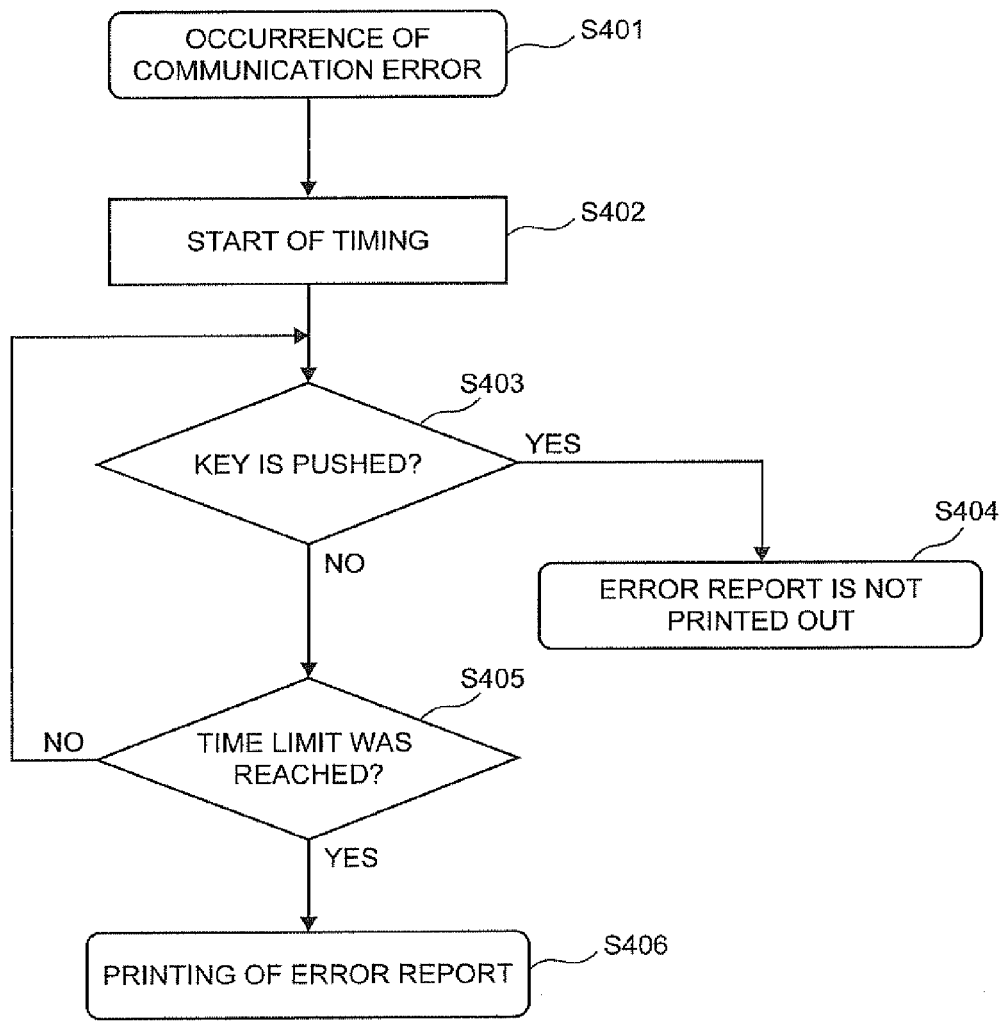
FIG. 4 is a flow chart showing a procedure by which an error report is output in accordance with an embodiment of the present invention.

The error detection unit 203 detects the occurrence of a communication error upon receipt of notification that no connection has been established (step S401 in FIG. 4). When the error detection unit 203 detects the occurrence of a communication error, the error detection unit 203 will notify the confirmation detection unit 205 and the printing unit 204 of the occurrence of a communication error.

When the confirmation detection unit 205 and the printing unit 204 are notified of the occurrence of a communication error, a timing unit 204a in the printing unit 204 will start measuring the amount of time that has elapsed since notification (step S402 in FIG. 4). The timing unit 204a will transmit the results of the time measurement to the comparison unit 204b. Then, the comparison unit 204b will compare this result with a predetermined time limit that is stored in advance in the time limit memory unit 206.

When the error detection unit 203 notifies the confirmation detection unit 205 and the printing unit 204 of the occurrence of a communication error, the error detection unit 203 will notify the user of the occurrence of the communication error. For example, the error detection unit 203 performs this notification by displaying a message indicating the occurrence of a communication error on the display panel 104 or generating a warning beep from a speaker (not shown in the figures).

The error detection unit 203 is able to notify the user of the occurrence of the communication error by the above notification methods, and prompt the user to operate keys arranged on the communication device 100, such as the numeric keypad 102, the function keys 103, and the like. If the user has noticed the occurrence of a communication error, the user can, for instance, confirm that the input telephone number is correct, place the original document on the paper tray 101 again, or enter the correct telephone number, and then attempt to transmit the original document again though the send operation control unit 201.

The confirmation detection unit 205 will detect whether or not one or more predetermined keys on the numeric keypad 102 have been pressed, or whether or not one or more predetermined function keys 103 have been pressed, after receiving notification of the occurrence of a communication error from the error detection unit 203. The confirmation detection unit 205 may directly detect the operation of the predetermined key(s), or indirectly detect the operation of the predetermined key(s) by detecting an input in the second operation control unit 201 therefrom. The timing unit 204a will continue to measure the elapsed time until either the confirmation detection unit 205 has detected the operation of the key(s), or until the comparison unit 204b determines that the elapsed time measured by the timing unit 204a has reached the time limit (the "NO" arrow of the step S403 and the "NO" arrow of the step S405 in FIG. 4). If the confirmation detection unit 205 detects that the predetermined key(s) on the numeric keypad 102 or the predetermined function key(s) 103 was pushed before the elapsed time measured by the timing unit 204a is equal to the predetermined time stored in the time limit memory unit 206 (the "YES" arrow of step S403 in FIG. 4), the timing unit 204a will terminate the measurement of time based on the detected results of the confirmation detection unit 205 at the point when the predetermined key(s) on the numeric keypad 102 or the predetermined function key(s) 103 was pushed. Then, the printing unit 204 will terminate operation and not print an error report (step S404 in FIG. 4).

On the other hand, if the confirmation detection unit 205 failed to detect operation of the predetermined key(s), and the comparison unit 204b has determined that the elapsed time counted by the timing unit 204a is equal to the predetermined time limit (the "NO" arrow in step S403 and the "YES" arrow in step S405 in FIG. 4), the output control unit 204c will control the output unit 204d so that the output unit 204d prints an error report (step S406 in FIG. 4). The timing unit 204 will terminate time measurement when it has received the comparison results of the comparison unit 204b, and the printing unit 204 will terminate printing operations after the error report is printed. Note that a general printing unit used for printing an error report, that is, a printing unit that prints on paper with a developer such as toner and the like, can be used as the output unit 204d.

As described above, if a user notices a communication error, and pushes one or more predetermined keys on a numeric keypad 102 or one or more predetermined function keys 103, an error report will not be printed. Thus, it is possible to reduce the output of unnecessary error reports in order to notify the user of the occurrence of communication errors. Note that each of the blocks shown in FIGS. 2 and 3 may be achieved with hardware logic. In addition, note that each of the blocks in FIGS. 2 and 3 may also be achieved with software working in conjunction with a digital signal processor (DSP), a central processing unit (CPU), a micro processing unit (MPU), or the like. In other words, the present invention can be achieved by providing a control program (i.e., software) to a CPU or the like via a recording medium on which the control program is readably stored, and then reading the control program from the recording medium and executing the control program by means of the CPU or the like.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A communication device, comprising:

a communication unit configured to communicate with one or more other devices and attempt to connect with intended recipient that is indicated by telephone number;

an error detection unit configured to detect an occurrence of a communication error in the communication unit and notify a user of the occurrence of the communication error, if a connection cannot be established after the communication unit has attempted to establish a connection with the recipient predetermined number of times;

a confirmation detection unit configured to detect confirmation of the occurrence of the communication error by a user, with prompting the user to operate keys arranged on the communication device, the keys being a numeric keypad or function keys, when the error detection unit notify the user of the occurrence of the communication error;

a time limit memory unit configured to memorize a predetermined time limit from a time at which the error detection unit has detected the occurrence of the communication error until a time of starting of error report printing error; and a printing unit configured to print an error report which indicates the communication error has occurred when the confirmation of the occurrence of the communication error has not been detected, and not to print an error report when the confirmation of the occurrence of the communication error has been detected until the predetermined time limit has passed after detecting the occurrence of the communication error.

2. The communication device according to claim 1, further comprising the time limit memory unit and the printing unit including:

an output unit configured to print error reports, a timing unit configured to measure the amount of time that has elapsed from the time at which the error detection unit has detected the occurrence of the communication error, a comparison unit configured to compare the elapsed time with the predetermined time limit stored in the time limit memory unit, and an output control unit having an output instruction unit, the output control unit being configured to instruct the output unit to print an error report if the predetermined time limit has elapsed since the error detection unit has detected the occurrence of the communication error, and the confirmation detection unit has not detected confirmation of the occurrence of communication error by the user.

* * * * *